US010662996B2

(12) United States Patent
Wilken et al.

(10) Patent No.: US 10,662,996 B2
(45) Date of Patent: May 26, 2020

(54) PUSH-PULL CABLE ARRANGEMENT FOR VIBRATION ISOLATION

(71) Applicant: DEERE & COMPANY, Moline, IL (US)

(72) Inventors: Nils Wilken, Mannheim (DE); Joerg Schulitz, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/351,596

(22) Filed: Mar. 13, 2019

(65) Prior Publication Data

US 2019/0285111 A1    Sep. 19, 2019

(30) Foreign Application Priority Data

Mar. 13, 2018   (DE) .......................... 10 2018 203 762

(51) Int. Cl.
*F16C 1/10* (2006.01)
*B60T 11/04* (2006.01)
(Continued)

(52) U.S. Cl.
CPC .............. *F16C 1/108* (2013.01); *B60T 7/102* (2013.01); *B60T 11/046* (2013.01); *F16C 1/14* (2013.01); *F16C 2326/01* (2013.01)

(58) Field of Classification Search
CPC ........ F16C 1/108; F16C 19/527; F16C 1/226; B60T 7/102; B60T 11/046
(Continued)

(56) References Cited

U.S. PATENT DOCUMENTS 5,570,611 A * 11/1996 Pospisil .................... B60T 7/06
                                                        74/502.6
6,898,996 B2 * 5/2005 Freund ..................... F16C 1/06
                                                        74/502.4
(Continued)

FOREIGN PATENT DOCUMENTS

DE         8810699 U1      10/1988
DE         19927055 A1  * 12/2000
EP         0936364 A1   *  8/1999

OTHER PUBLICATIONS

Rubber Hardness Chart, Rubber Durometer Scale—Mykin Inc., mykin.com.rubber-hardness-chart, Oct. 30, 2019 (Year: 2019).*
(Continued)

*Primary Examiner* — Vinh Luong
(74) *Attorney, Agent, or Firm* — Taft Stettinius & Hollister LLP; Stephen F. Rost

(57) ABSTRACT

An arrangement for isolating vibration of Bowden cable-actuated components includes a Bowden cable, an actuation element coupled at one end to the Bowden cable and including a mounting eye, a damping element arranged in a positive-fit connection in the mounting eye, and a transmitter element supported within the damping element for actuating the Bowden cable such that it can be deflected. The damping element includes an elastic grommet having a defined recess lying in a specified deflection direction of the transmitter element. In a non-actuated state, the transmitter element is disposed at a centered position within the elastic grommet and is movable into contact with the mounting eye due to the effect of a deflecting actuation force under compression of the elastic grommet in an area of the recess.

11 Claims, 7 Drawing Sheets

(51) Int. Cl.
  *B60T 7/10* (2006.01)
  *F16C 1/14* (2006.01)
(58) Field of Classification Search
  USPC .......................................................... 74/502.5
  See application file for complete search history.

(56) References Cited

U.S. PATENT DOCUMENTS

| | | | | |
|---|---|---|---|---|
| 2003/0223805 | A1* | 12/2003 | Ruhlander | F16C 1/108 |
| | | | | 403/122 |
| 2008/0250892 | A1* | 10/2008 | Gordy | F16C 1/262 |
| | | | | 74/501.5 R |
| 2010/0116084 | A1* | 5/2010 | Steuernagel | F16C 1/20 |
| | | | | 74/502.5 |

OTHER PUBLICATIONS

EPO Machine Translation of DE 19927055 A1, Lange et al., Dec. 21, 2000 (Year: 2000).*

European Search Report, European Patent Office, EP 19161946.9, dated Jul. 16, 2019.

* cited by examiner

PUSH-PULL CABLE ARRANGEMENT FOR VIBRATION ISOLATION

RELATED APPLICATIONS

This application claims priority to German Patent Application Ser. No. 102018203762.0, filed Mar. 13, 2018, the disclosure of which is hereby incorporated by reference in its entirety.

FIELD OF THE DISCLOSURE

The present disclosure relates to an arrangement or system for the vibration isolation of Bowden cable-actuated components.

BACKGROUND

Due to their flexibility and robustness, Bowden cables are used in vehicles for controlling various mechanical functions. However, undesired vibrations can be transferred via the Bowden cable to a transmitter element provided for actuating the Bowden cable. This can lead, in turn, to disruptive vibrations being transferred into a driver's environment in the vehicle, in which the transmitter element is spatially located.

Thus, there is a need for an arrangement for vibration isolation that is adapted for use with Bowden cable-actuated components and the like.

SUMMARY

In the present disclosure, one embodiment of the vibration isolation of Bowden cable-actuated components includes a Bowden cable, an actuation element that is attached on one end to the Bowden cable and has a mounting eye, a damping element arranged in a positive-fit connection in the mounting eye, and a transmitter element supported within the damping element such that it can be deflected for actuating the Bowden cable, wherein the damping element is constructed as an elastic grommet with a recess lying in a specified deflection direction of the transmitter element such that, in the non-actuated state, the transmitter element assumes a centered position within the elastic grommet and can be brought into contact with the mounting eye with the effect of a deflecting actuation force under compression of the elastic grommet in the area of the recess.

In other words, the transmitter element is held at a distance from the actuation element on all sides in the non-actuated, consequently force-free state of the elastic grommet so that the possibility of vibrations being transferred via the attached Bowden cable to the transmitter element is essentially ruled out. For the case of its deflection, in contrast, the transmitter element can press directly on the actuation element due to the applied tensile or compressive force for actuating the Bowden cable within the mounting eye, which leads to a precisely defined compression point. The deflection of the transmitter element can be realized here by means of a control element or the like connected to the transmitter element.

The arrangement or system can be used, for example, in connection with Bowden cable-actuated vehicle components that are in a non-tensioned state while driving, because the Bowden cable and the connected transmitter element are typically free of forces in such a case. In particular, the transmitter element can be part of a control element constructed as a hand or foot lever for a vehicle, wherein this control element is provided for actuating an immobilization brake or parking brake that is to be released while driving.

A collar surrounding each end side of the mounting eye can be constructed on the elastic grommet. The surrounding collar is used for the axial centering of the elastic grommet within the mounting eye.

To implement rotational locking or radial centering of the elastic grommet within the mounting eye, it is possible to provide on one end side of the mounting eye at least one projection that engages in an associated recess in the collar of the elastic grommet. The projection can be a spring pin that is pressed with excess length on both sides into a through hole formed on the end sides on the mounting eye and extends into openings in the collar of the elastic grommet aligned with the through hole.

In addition or as an alternative, there is the possibility that the elastic grommet has an outer contour corresponding to an asymmetric inner contour of the mounting eye, whereby a rotational locking or radial centering of the elastic grommet within the mounting eye is likewise implemented. For this purpose, transverse pockets running along the asymmetric inner contour of the mounting eye can be constructed, in which the transverse brackets formed on the outer contour of the elastic grommet can engage in a positive-fit connection.

With respect to achieving the highest possible damping effect, the elastic grommet can be made from a rubber mixture with a hardness in the range from 20 to 90 Shore A. Because the elastic grommet is essentially free of forces in the non-actuated state of the transmitter element and is thus non-compressed or released from tension, there is the possibility of using a relatively soft rubber mixture with correspondingly high capacity for vibration damping.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
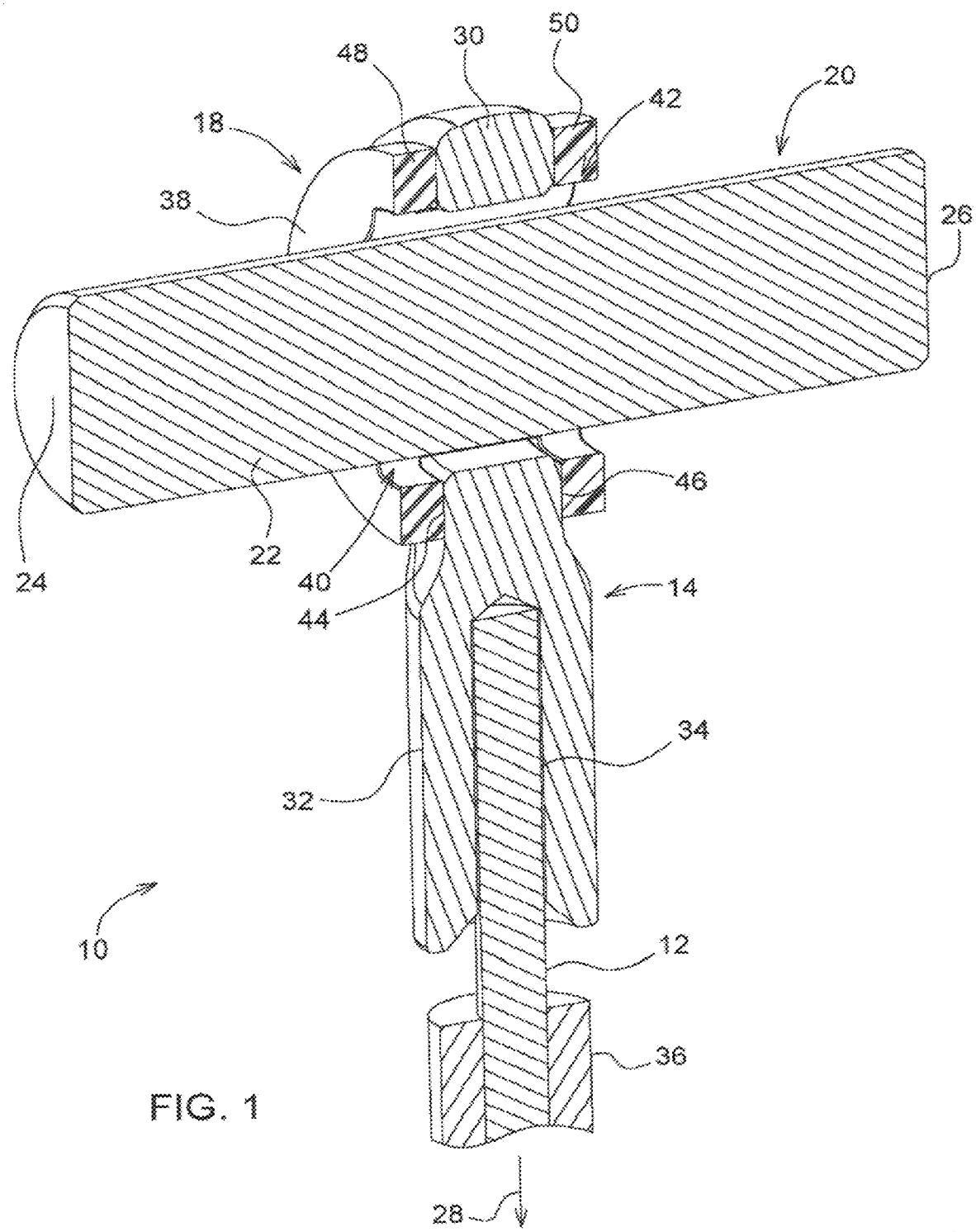
FIG. 1 is a perspective sectional view of a first embodiment of an arrangement for the vibration isolation of Bowden cable-actuated components.

FIG. 1 shows a perspective sectional view of a first embodiment of an arrangement or system for isolating vibration of Bowden cable-actuated components. The arrangement or system 10 may include a Bowden cable 12, an actuation element 14 that is attached on the end side to the Bowden cable 12 and has a mounting eye 16, a damping element 18 arranged in the mounting eye 16 in a positive-fit connection, and a transmitter element 20 that is supported within the damping element 18 such that it can be deflected.

In one example, the transmitter element 20 has the shape of a cylindrical pin 22, which is part of a control element (not shown in FIG. 1) formed as a hand or foot lever for a vehicle. Here, the control element is provided for actuating the immobilization brake or parking brake that is to be released while driving. The cylindrical pin 22 extends through the damping element 18 and is connected on its open ends 24, 26 to an actuation mechanism of the hand or foot lever, by means of which the cylindrical pin 22 can be actuated or can be displaced in a specified deflection direction 28.

The actuation element 14 includes a flattened head 30, in which the mounting eye 16 is formed, as well as a cylindrical fastening section 32 for attaching the Bowden cable 12. The attachment of the Bowden cable 12 is realized by producing a press-fit connection within an end-side receptacle opening 34 of the cylindrical fastening section 32. The actuation element 14 is a forged part made from a suitable steel alloy or a high-strength plastic part. A plastic sheathing 36 is used to protect the Bowden cable 12 consisting of a plurality of steel wire strands from external damage.

Figure 2:
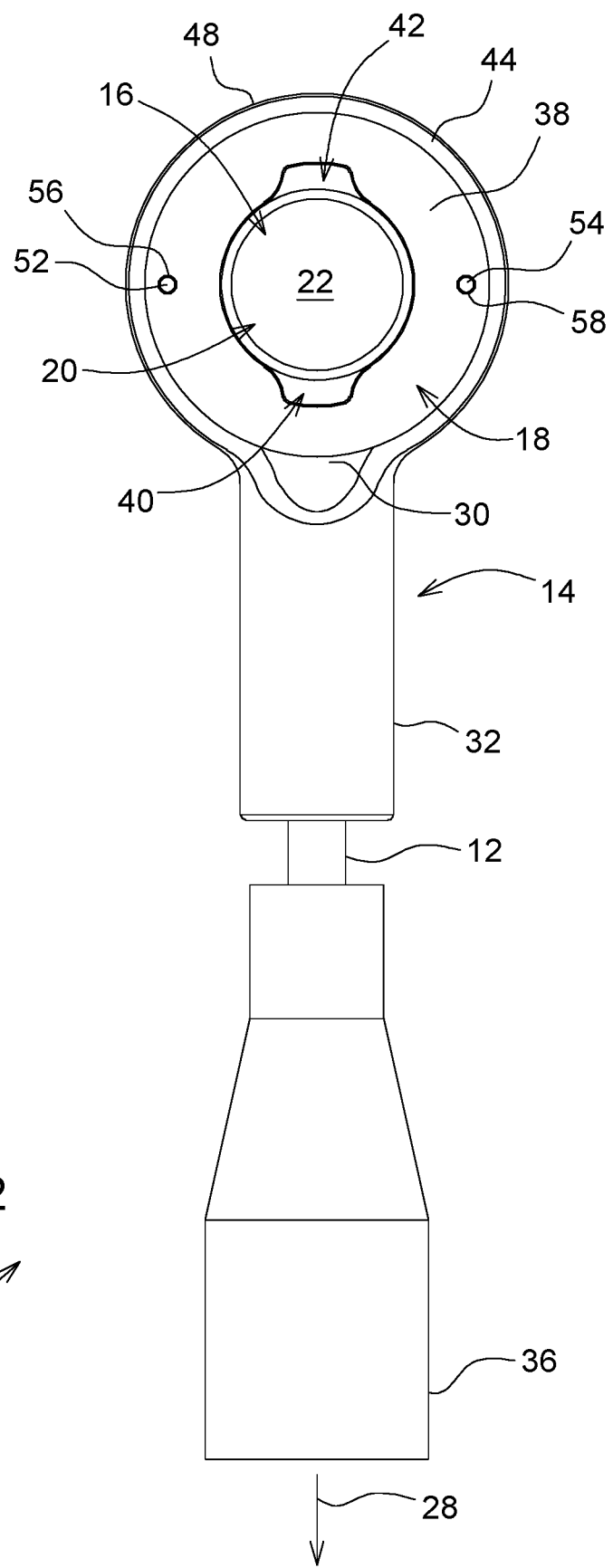
FIG. 2 is a top view of the arrangement shown in FIG. 1.

FIG. 2 shows a top view of the arrangement 10 of FIG. 1. Moreover, the actuation element 14 is shown in detail in FIG. 3 and the damping element 18 is shown in FIG. 4.

Accordingly, the damping element 18 is constructed as an elastic grommet 38 with a recess 40 lying in the specified deflection direction 28 of the transmitter element 20. Here, the transmitter element 20 assumes a centered position in the non-actuated state within the elastic grommet 38 and is brought into contact with the mounting eye 16 with the effect of a deflecting actuation force $F_b$ exerted by means of the hand or foot lever under compression of the elastic grommet 38 in the area of the recess 40. The latter arrangement is shown in FIG. 2 by an actuated state of the transmitter element 20 drawn without dashed lines. The recess 40 is a material-free zone with pocket-shaped construction that extends up to the edge of the mounting eye 16, wherein its width is less than the diameter of the transmitter element 20 or the cylindrical pin 22. The latter is required to exert an adequate centering effect on the transmitter element 20 or the cylindrical pin 22 also in the specified deflection direction 28.

In the present case, another recess 42 arranged opposite the recess 40 with respect to the specified deflection direction 28 is provided, so that the transmission of tensile and also compressive forces occurring with the actuation of the transmitter element 20 can be equally taken into account.

In other words, the transmitter element 20 is held at a distance from the actuation element 14 on all sides in the non-actuated, consequently force-free state of the elastic grommet 38, so that the possible transfer of vibrations via the attached Bowden cable 12 to the transmitter element 20 is essentially ruled out, reduced or eliminated. Due to the deflection of the hand or foot lever, in contrast, the transmitter element 20 can press directly on the actuation element 14 due to the tensile or compressive force applied for actuating the Bowden cable 12 within the mounting eye 16, which leads to a precisely defined pressure point.

In addition, on the elastic grommet 38, a collar 48, 50 is formed surrounding each end side 44, 46 of the mounting eye 16 (see FIG. 4). The surrounding collar 48, 50 is used for the axial centering of the elastic grommet 38 within the mounting eye 16. In order to achieve the highest possible damping effect, the elastic grommet 38 is made from a rubber mixture with a hardness in the range from 20 to 90 Shore A.

Figure 3:
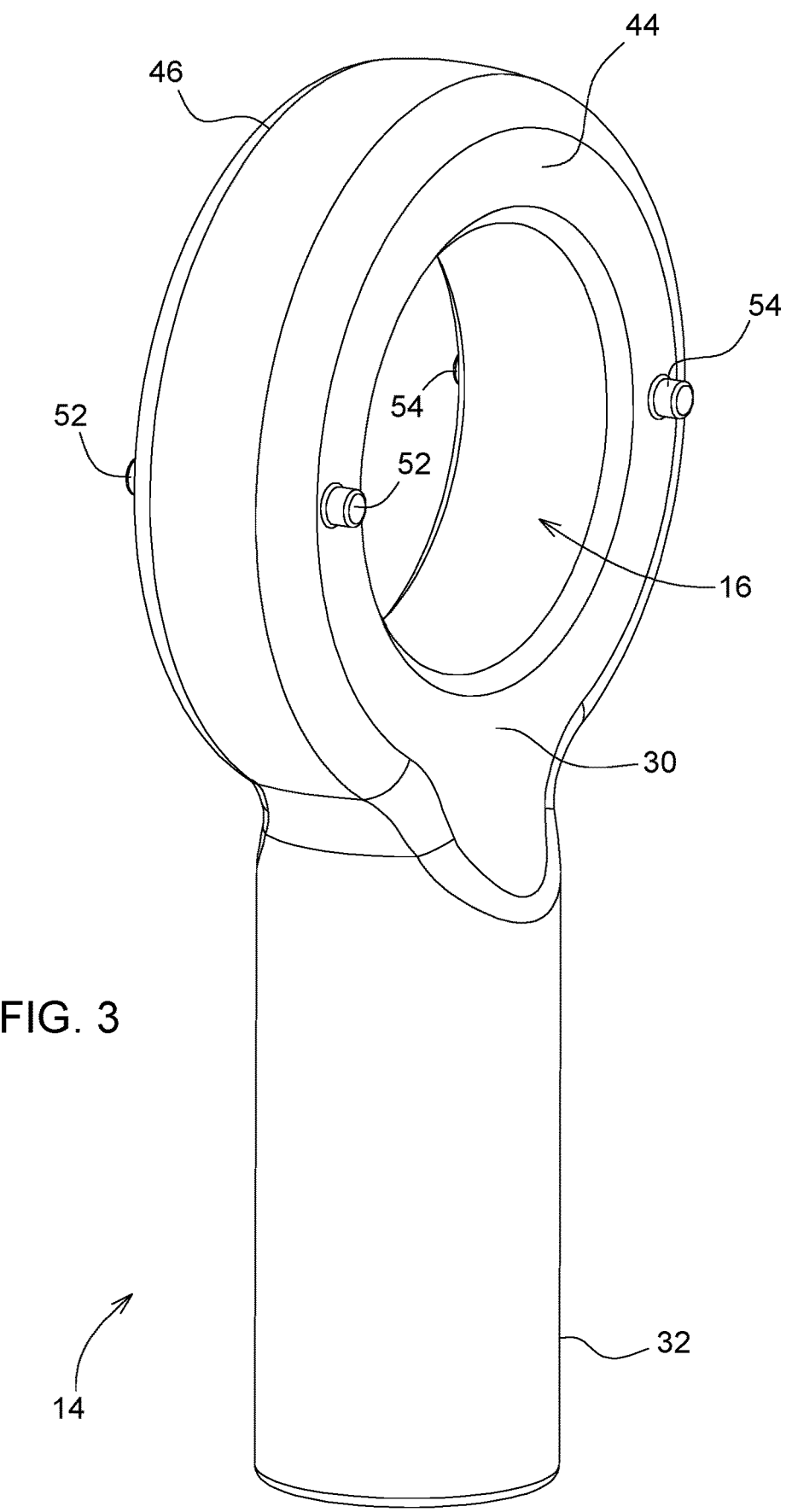
FIG. 3 is a perspective view of an actuation element included in the arrangement according to FIG. 1.
Figure 4:
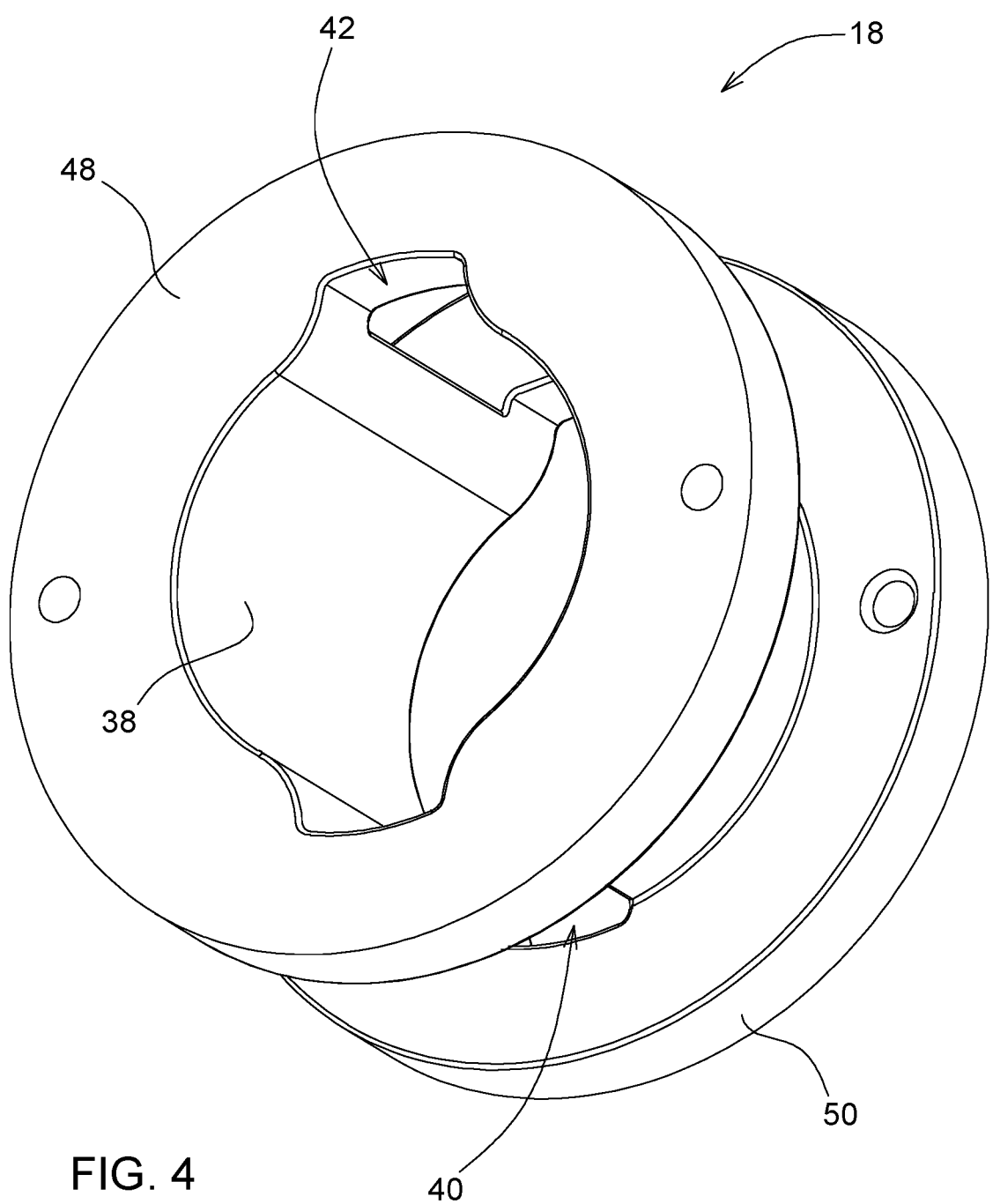
FIG. 4 is a perspective view of a damping element included in the arrangement according to FIG. 1 in the form of an elastic grommet.

For implementing a rotational or axial locking of the elastic grommet 38 within the mounting eye 16, there are two projections 52, 54 on adjacent sides on the two end sides 44, 46 of the mounting eye 16 (see FIG. 3). Each of the two projections 52, 54 engages in an associated recess 56, 58 within the collar 48, 50 of the elastic grommet 38. The projections 52, 54 may be spring pins that are pressed with excess length on both sides into the through holes formed on the end sides on the flattened head 30 of the actuation element 14 and extend into openings in the collar 48, 50 of the elastic grommet 38 aligned with the through holes.

Figure 5:
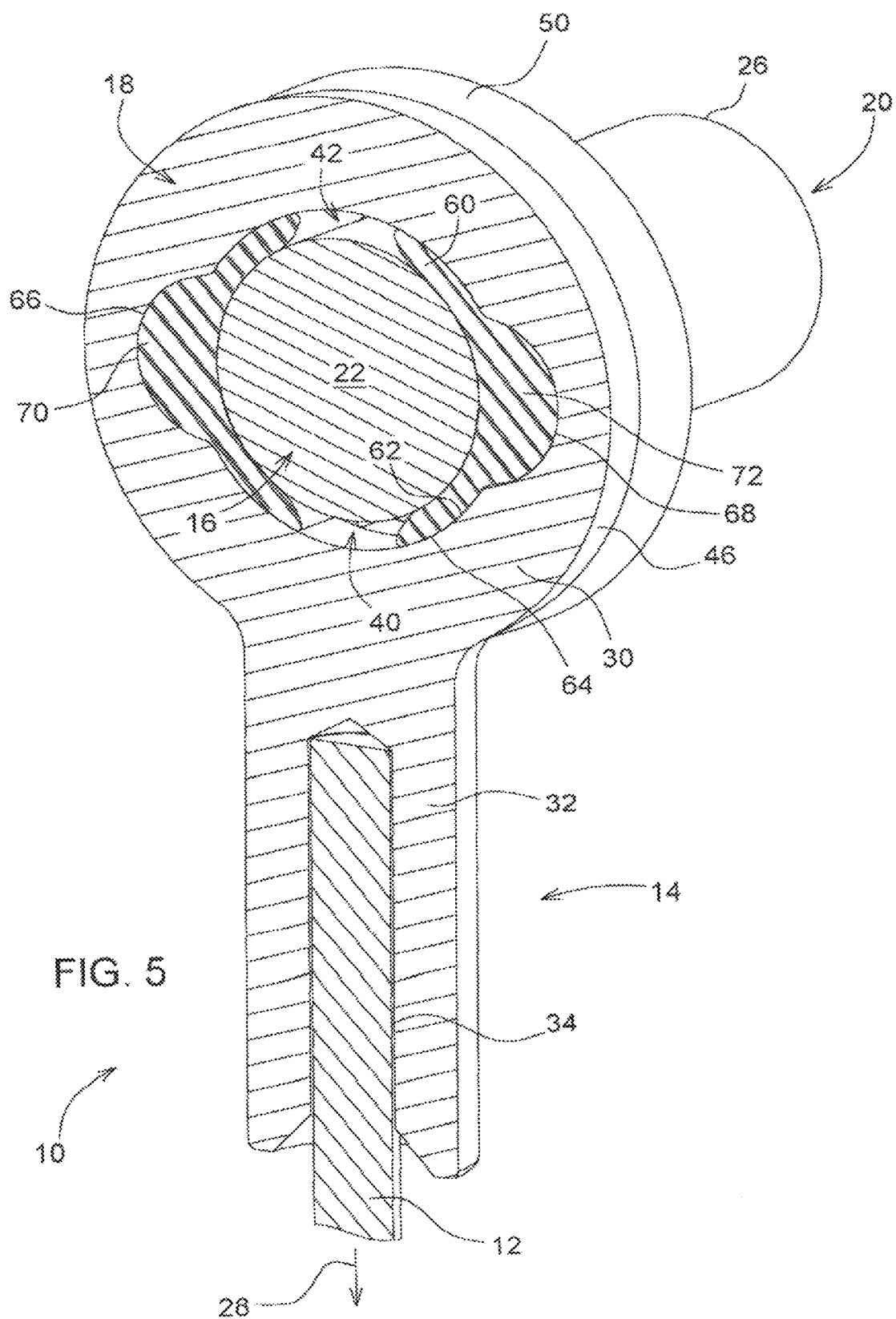
FIG. 5 is a perspective sectional view of a second embodiment of the arrangement for the vibration isolation of Bowden cable-actuated components.
Figure 6:
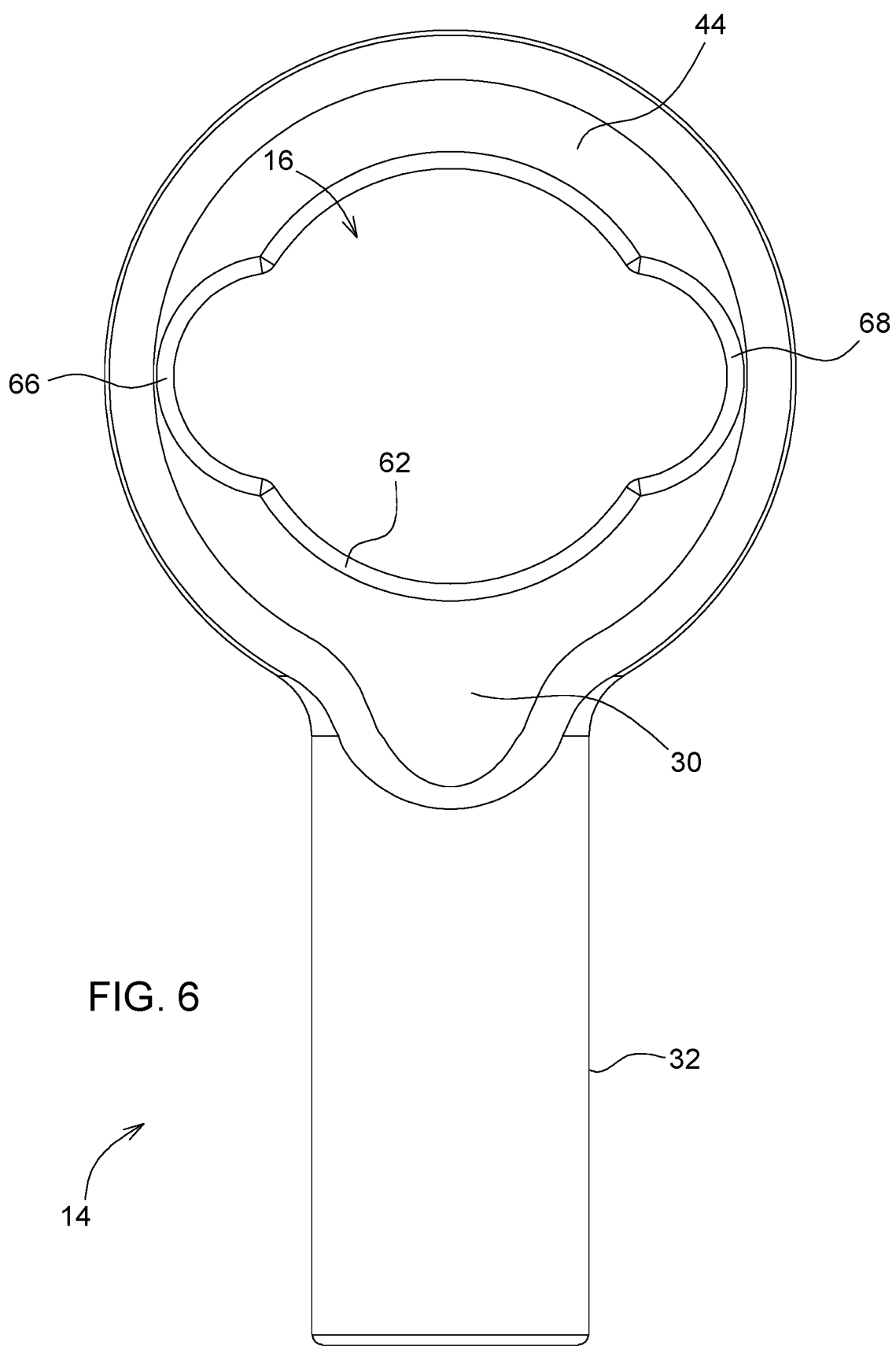
FIG. 6 is a perspective view of an actuation element included in the arrangement according to FIG. 5.
Figure 7:
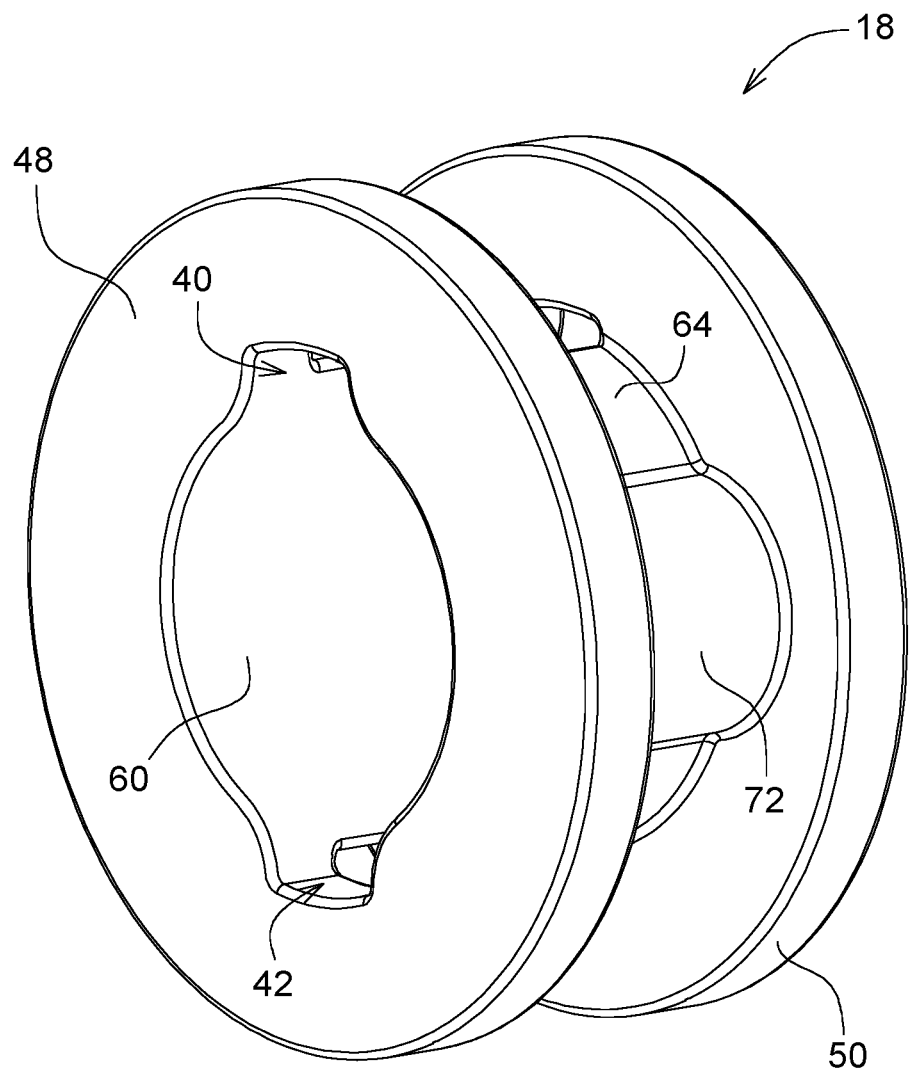
FIG. 7 is a perspective view of a damping element included in the arrangement according to FIG. 5 in the form of a modified elastic grommet.

FIG. 5 shows a second embodiment of the arrangement. This embodiment differs from the first embodiment shown in FIG. 1 with respect to the construction of the actuation element 14 or the damping element 18, which is to be seen in detail in FIG. 6 or FIG. 7. Accordingly, a modified elastic grommet 60 is provided that has an outer contour 64 corresponding to an asymmetric inner contour 62 of the mounting eye 16, whereby rotational locking or radial centering of the elastic grommet 60 within the mounting eye 16 is implemented. For this purpose, transverse pockets 66, 68 running along the inner contour 62 of the mounting eye 16 are formed (see FIG. 6), in which transverse brackets 70, 72 (see FIG. 7) formed on the outer contour 64 of the elastic grommet 60 engage in a positive-fit connection.

With respect to the rest of the function of arrangement 10, reference is made to the description above with respect to the first embodiment.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An arrangement for isolating vibration of Bowden cable-actuated components, comprising:
    a Bowden cable;
    an actuation element having a first end coupled to the Bowden cable and a second end comprising a mounting eye;
    a damping element arranged in a positive-fit connection in the mounting eye; and
    a pin sized and shaped to be supported within the damping element;
    wherein, the damping element comprises an elastic grommet having a defined recess lying in a specified deflection direction of the pin;
    wherein, in a non-actuated state, the pin is disposed at a centered position within the elastic grommet, wherein, in an actuated state, the pin is in contact with the mounting eye due to the effect of a deflecting actuation force applied to the pin to cause compression of the elastic grommet in an area of the defined recess, wherein, the arrangement further comprises a collar surrounding each side of the mounting eye and at least one projection positioned on a side of the mounting eye, and wherein, the at least one projection engages in an associated recess in the collar of the elastic grommet.

2. The arrangement of claim 1, wherein the collar is disposed on the elastic grommet.

3. The arrangement of claim 1, wherein:
the elastic grommet comprises an outer contour,
the mounting eye comprises an asymmetric inner contour, and
the outer contour of the elastic grommet corresponds to the asymmetric inner contour of the mounting eye.

4. The arrangement of claim 1, wherein the elastic grommet comprises a rubber mixture with a hardness in the range from 20 to 90 Shore A.

5. The arrangement of claim 1, wherein the actuation element comprises a flattened head portion and a fastening portion, the mounting eye being formed in the flattened head portion and the Bowden cable being coupled to the fastening portion.

6. The arrangement of claim 1, further comprising a sheathing partially disposed around the Bowden cable for protection.

7. The arrangement of claim 1, wherein the actuation element is spaced from the pin in the non-actuated state to isolate vibrations from the Bowden cable to the pin.

8. A system for isolating vibration within a plurality of Bowden cable-actuated components, comprising:
a Bowden cable;
an actuation element having a first end coupled to the Bowden cable and a second end comprising a mounting eye;
a damping element arranged in a positive-fit connection in the mounting eye; and
a pin sized and shaped to be supported within the damping element;
wherein, the damping element comprises an elastic grommet having a defined recess adjacent the pin;
wherein, in a non-actuated state, the pin is disposed at a centered position within the elastic grommet,
wherein, in an actuated state, the pin is in contact with the mounting eye due to the effect of a deflecting actuation force applied to the pin to cause compression of the elastic grommet in an area of the defined recess,
wherein, the arrangement further comprises a collar surrounding each side of the mounting eye and at least one projection positioned on a side of the mounting eye, and
wherein, the at least one projection engages in an associated recess in the collar of the elastic grommet.

9. The system of claim 8, wherein the collar is disposed on the elastic grommet.

10. The system of claim 8, wherein:
the elastic grommet comprises an outer contour,
the mounting eye comprises an asymmetric inner contour, and
the outer contour of the elastic grommet corresponds to the asymmetric inner contour of the mounting eye.

11. A system for isolating vibration within a plurality of Bowden cable-actuated components, comprising:
a Bowden cable;
an actuation element having a first end coupled to the Bowden cable and a second end comprising a mounting eye;
a damping element arranged in a positive-fit connection in the mounting eye; and
a pin supported within the damping element;
wherein, the damping element comprises an elastic grommet having a defined recess lying in a specified deflection direction of the pin;
wherein, in a non-actuated state of the pin, the pin is disposed at a centered position within the elastic grommet,
wherein, in an actuated state of the pin, the pin is in contact with the mounting eye due to the effect of a deflecting actuation force applied to the pin to cause compression of the elastic grommet in an area of the defined recess,
wherein, the arrangement further comprises a collar surrounding each side of the mounting eye and at least one projection positioned on a side of the mounting eye; and
wherein, the at least one projection engages in an associated recess in the collar of the elastic grommet.

* * * * *